United States Patent Office 2,851,330
Patented Sept. 9, 1958

2,851,330

METHOD OF TREATING MOLDS

William C. Taylor, Toledo, Ohio, assignor to Owens-Illinois Glass Company, a corporation of Ohio No Drawing. Application April 15, 1955
Serial No. 501,705

6 Claims. (Cl. 18—47)

The present invention relates to methods for treating the surfaces of molds and more particularly to an improved method of treating mold surfaces to facilitate the release of molded materials, for example molded inorganic materials such as calcium silicates, gypsum or other molding materials prone to attack mold surfaces. This method provides a protective interface which will also prevent adhesion, oxidation or other detrimental effects to the molding surfaces. This method of treating mold surfaces may also be useful in the molding of other materials.

The present invention consists in the provision of a practical and economical treatment of mold surfaces. In order to eliminate one of the problems, namely, adhesion of molded articles to the mold surfaces, a material must be employed which will in itself adhere to the mold surfaces and provide a durable coating able to resist the wear of successive molding operations.

In molding slurries of inorganic materials where the molds are subjected to excessive amounts of water, iron or steel molds are usually coated with a petroleum fraction similar to motor oil to simultaneously prevent sticking of the molded materials within the molds and rusting of the mold metals. This coating is not entirely satisfactory for oils alone are not sufficiently adherent to the mold surfaces. The oils are removed from the mold surfaces both by the action of the water and/or the siliceous materials present in the molding materials and by the adherence of the oils to the surfaces of the molded articles. Thus, the interior surfaces of the molds must be frequently coated to prevent sticking of the molded articles and rusting of the molds, and thereby furnish only temporary solutions to these problems because of their short durability. This is especially true when materials such as calcium silicates are molded in iron molds. The adherence of the shaped products which are relatively fragile to the mold surfaces causes breakage of the products on removal and thus, contamination of the mold walls, and necessitates that they be frequently cleaned.

The principal object of this invention is to provide an improved method of coating the interior surfaces of metallic molds to prevent both adhesion between molded inorganic materials and metallic mold surfaces and oxidation of the said mold surfaces.

Another object of this invention is to provide a simple and economical method of mold coating which can be easily applied to mold interiors to accelerate the release of molded products therefrom with reduced breakage to furnish cleaner molds for further molding operations.

Further objects of this invention are to provide a more durable coating for mold surfaces which is adaptable to uniform and rapid application by various means and which will remain adherent to the molds for extensive periods to improve the quality of the molded products and accelerate continuous molding operations.

The specific nature of this invention as well as other objects and advantages thereof will become more apparent to those skilled in the art from the following detailed description.

My improved composition for the treatment of mold surfaces consists of a low molecular weight, partially oxidized polyethylene which has been dissolved in a petroleum fraction of about the composition and consistency of light motor oil. This composition is particularly valuable in the autoclave molding of calcium silicates in iron or steel molds in the production of insulating or other silicate materials. The coating is applied to the material contacting surfaces of the molds and serves both as a releasing agent and rust preventative for the mold metals.

In the treatment of molds, this polyethylene mixture has shown physical properties of excellent adherence to metal molds and some adherence to molded, inorganic materials such as calcium silicates. The preferable form of polyethylene for these purposes consists of low molecular weight, partially oxidized polyethylene having the consistency of hard wax at atmospheric temperatures. When it is applied alone and in its waxy form, an uneven coating is usually obtained, possibly leaving areas of the molding surfaces uncoated, to which the molded materials can adhere and which can readily oxidize to build up a layer of rust.

In order to insure that all portions of the molding area will be covered and that the coating is evenly and uniformly applied, the molding surfaces, after coating, are subjected to a temperature at or in excess of the temperature required to meld the polyethylene. This application of heat causes the coating to flow and smooth out over the mold surfaces. Where a situation exists which requires the provision of an extremely fine and smooth molding surface and without the possibility of discoloration of molding material, the above procedure is utilized. However, where such extremely fine surfaces are not a requisite, then the polyethylene may be dissolved in a carrier and sprayed, dipped or brushed over the molding surfaces.

It has been found that a thin film or protective coating of the surfaces can be obtained by the use of polyethylene dissolved or suspended in various light oils. The polyethylene having a melting point in the range of 205 to 210° F. is dissolved in a suitable oil by heating and stirring the two constituents together at a temperature in the range of 200 to 220° F. Suspension oils which have been found to produce the best results consist of liquid petroleum fractions having no additives therein of the composition and consistency of light motor or lubricating oils. The petroleum oils which provide the most suitable suspension mediums for the polyethylene have viscosities in the range of 35 to 40 S. S. U. at 210° F. and flash points in the range of 340 to 360° F. Various other petroleum products or hydrocarbons having similar properties may be substituted for these oils as a suitable carrier for the polyethylene.

When one to approximately fifteen percent by weight of polyethylene is incorporated into the oil by the above method a product is obtained that has the approximate consistency of Vaseline on cooling. When the oil is heated above the melting point of the polyethylene wax, the wax will dissolve in the oil. Upon cooling, the polyethylene will precipitate out of the solution in the form of fine, suspended particles, the size of which is determined by the cooling procedure.

The preferable composition for coating the mold surfaces is a three percent (3%) concentration of polyethylene in oil. This product provides a sufficient wax-like coating on the molds and is more easily applied as a thin, unbroken film. This composition is best prepared in batches where all of the polyethylene wax is dissolved in only a portion of the total oil required, which portion is heated to a temperature of approximately 220° F. prior to dissolving the polyethylene therein. After the polyethylene melts and dissolves in this heated portion of the oil on stirring, it is then poured and stirred into the remainder of the oil at room temperature. This method of preparation requires less heat to mix the solution and a finer particle size of the polyethylene suspension is obtained which is less likely to settle out of the mixture.

The polyethylene-containing composition may be applied to the mold surfaces by various equally efficient and expedient methods and may be applied hot or cold. The composition in heated, liquid form may be sprayed, brushed, or dipped to place a thin film of the coating over the desired surfaces. The unheated composition may be brushed or rubbed over the mold surfaces. Portions of the molds which are difficult to oil because of their inaccessibility and likely to be missed in the oiling operation can be fully coated by proper application of the polyethylene mixture. The coating may be applied over the entire mold or over the interior mold surfaces only. The coating is equally applicable to molds having rough or configurated surfaces as well as smooth, highly finished surfaces. The selected method of coating produces an unbroken film over the mold surface treated to prevent oxidation thereof and facilitates rapid parting of the mold and molded article.

It is the inherent characteristic of the polyethylene in the coating to soften and/or melt during the molding operation of heat molded or heat reacted materials and thereby form a liquid interface between the mold walls and the material being molded. In the autoclave molding of calcium silicates the molded materials are heated to temperatures of approximately 400° F. to form the products, at which temperatures the polyethylene is in the liquid state between molded and molding surfaces. The polyethylene possesses properties of aversion to penetrate the molded calcium silicates and adherence to the iron mold surfaces. The oil enters the molded material and leaves behind the polyethylene adhering to the mold. The polyethylene which forms a liquid interface during the molding operation solidifies as a solid interface when the molds are cooled before removal of the molded articles. Only a minute amount of the polyethylene is removed from the mold by adherence to the surfaces of the molded articles as the said polyethylene forms a parting line between said mold and molded articles. The film is resistant to the wearing effect of continuous molding to considerably prolong the period of mold parting and protection.

The molds may be quickly cleaned of the polyethylene coating by the action of a dilute acid. The coating of wax provided by a 3 percent concentration of polyethylene in oil is so thin that immersion of a coated mold in a 3½ percent solution of hydrochloric acid for less than a minute is sufficient to clean the mold to the bare metal. Thus, the thin coating as normally applied, may be completely and quickly removed by a dilute acid.

The coating is very resistant to wear in continuous molding operations. The availability of iron molds for molding calcium silicate articles from slurries has been increased threefold by the use of this composition and method of coating the interior mold surfaces.

Various modifications of this invention may be resorted to within the spirit and scope of the appended claims.

I claim:

1. The method of providing a liquid interface between a mold wall and siliceous moldable material during the heat reaction period of said moldable material at a temperature in excess of 210° F. and a solid interface during the cooling period of said material in the mold at a temperature of below 210° F. to effect a definite separation between said mold wall and said material comprising coating said mold wall at room temperature with a suspension in an oily carrier of a minor amount of partially oxidized, low-molecular weight polyethylene particles having the consistency of hard wax at atmospheric temperature, said polyethylene particles melting during said heat reaction period when the temperature is greater than 210° F., the molten polyethylene forming a liquid interface between said mold wall and said siliceous moldable material, said molten polyethylene solidifying when said heat reaction temperature is below 210° F. to form a solid interface between said mold wall and the molded siliceous material.

2. The method as defined in claim 1 wherein said polyethylene particles suspended in said oily carrier are 1–15% by weight of said oily carrier.

3. The method as defined in claim 1 wherein said polyethylene particles suspended in said oily carrier are 3% by weight of said oily carrier.

4. The method of providing a separable interface between metal molding surfaces and heat-reacted siliceous materials, which method comprises applying to said metal molding surfaces an adhering protective coating, said coating consisting essentially of a mixture of a light petroleum oil and a minor amount of partially oxidized, low molecular weight polyethylene particles having the consistency of hard wax at atmospheric temperature suspended therein, said polyethylene having a melting point within the range of 205–210° F., said mixture having the physical consistency of petroleum jelly, said polyethylene retaining its adhesion to said molding surfaces in melted form when said siliceous material within said metal molding surfaces are subjected to a reactive temperature of approximately 400° F. and pressure required for converting said siliceous material into solid form.

5. The method as defined in claim 4 wherein said mixture consists essentially of from 1–15% by weight of polyethylene particles.

6. The method defined in claim 4 wherein the polyethylene particles in said mixture are 3% by weight of said total mixture.

References Cited in the file of this patent

UNITED STATES PATENTS

| | | |
|---|---|---|
| 2,219,700 | Perrin et al. | Oct. 29, 1940 |
| 2,256,603 | Wright | Sept. 23, 1941 |
| 2,586,587 | Wendt | Feb. 19, 1952 |
| 2,677,165 | Copenhaver et al. | May 4, 1954 |

OTHER REFERENCES

Ser. No. 342,900, Fickert (A. P. C.), published Apr. 27, 1943.